United States Patent Office.

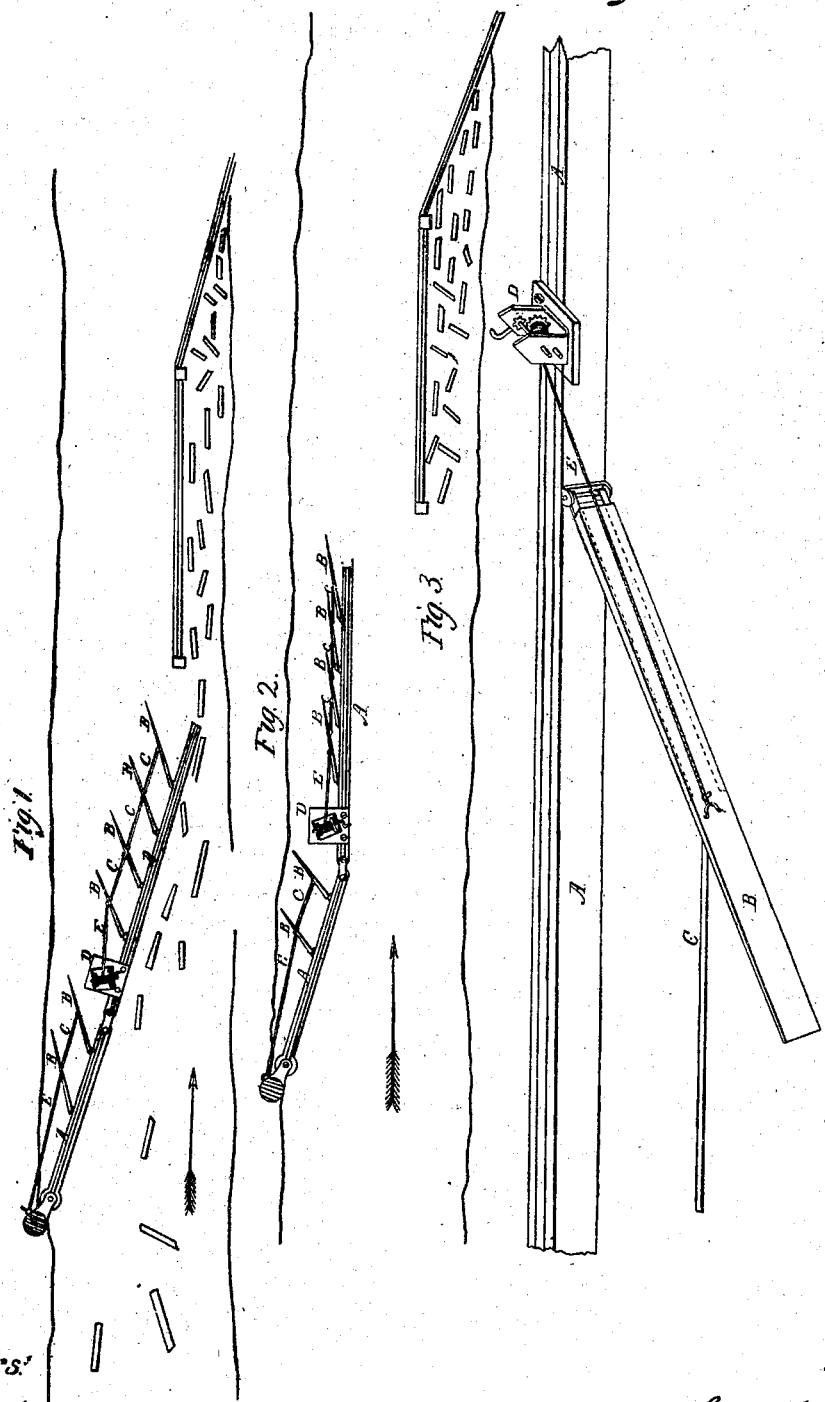

LEVI W. POND, OF EAU CLAIRE, WISCONSIN, ASSIGNOR TO HIMSELF AND EAU CLAIRE LUMBER COMPANY, OF SAME PLACE.

Letters Patent No. 80,663, dated August 4, 1868.

IMPROVED DEVICE FOR SHEERING BOOMS.

The Schedule referred to in these Letters Patent and making part of the same.

TO ALL WHOM IT MAY CONCERN:

Be it known that I, LEVI W. POND, of Eau Claire, in the county of Eau Claire, and State of Wisconsin, have invented a new and improved Sheer-Rudder Boom; and I do hereby declare that the following is a full, clear, and exact description thereof, which will enable others skilled in the art to make and use the same, reference being had to the accompanying drawings forming part of this specification.

Figure 1 is a view showing my improved sheer-rudder boom closed.

Figure 2 is the same view, showing the boom opened.

Figure 3 is an enlarged detail perspective view of a portion of the boom.

Similar letters of reference indicate corresponding parts.

My invention has for its object to furnish an improved boom, which shall be so constructed and arranged that it may be held in place to stop the floating, and opened and closed when required, by the action of the current of the stream, and it consists in the combination of rudders with the boom, the whole being constructed and arranged as hereinafter more fully described.

A is the boom, which may be made in two or more parts securely hinged to each other, as shown in figs. 1 and 2. The shore-end of the boom A is hinged or otherwise pivoted or secured to a spile or other firm support upon the shore.

To the down-stream side of the boom A are securely hinged or pivoted rudders B, the number of which must depend upon the length of the boom and the force of the current.

The rudder B of the boom A, or rather the rudders of each part or piece of said boom, are connected to each other by connecting-rods or bars C, the ends of which are pivoted to the adjacent sides of the contiguous rudders as shown in the drawings, so that all the rudders thus connected together may always move together, and be always held parallel with each other.

D is a windlass or capstan, placed upon or connected with the end of each part or piece of the boom A.

E is a rope, one end of which is attached to the windlass or capstan D, and the other end of which is attached to the nearest rudder of that part or piece of the boom with which the said windlass or capstan D is connected.

By this construction, by operating the windlass or capstan D to wind up or let out the rope E, the angle at which the rudders B stand to the boom A may be adjusted as required, so that the force of the current acting upon the said rudders may hold the said boom in its place, open it to permit the passage of boats, rafts, &c., and close it again, as required.

I claim as new, and desire to secure by Letters Patent—

The combination of the rudders B with the boom A, whether said boom be made in one or more parts or pieces, substantially as herein shown and described, and for the purpose set forth.

The above specification of my invention signed by me, this twenty-third day of January, 1868.

LEVI W. POND.

Witnesses:
J. B. DEMAREST,
ALEX. KEMPT.